(12) United States Patent
Paris et al.

(10) Patent No.: US 7,341,445 B2
(45) Date of Patent: Mar. 11, 2008

(54) MOLTEN MOLDING MATERIAL DISPENSER

(75) Inventors: Alexandre Edouard Raoul Paris, Utopia (CA); Douglas James Weatherall, Bolton (CA)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 222 days.

(21) Appl. No.: 11/096,379

(22) Filed: Apr. 1, 2005

(65) Prior Publication Data

US 2006/0222731 A1    Oct. 5, 2006

(51) Int. Cl.
*B29C 45/23* (2006.01)
(52) U.S. Cl. ...................................... 425/564
(58) Field of Classification Search ............... 425/562, 425/563, 564, 565, 566
See application file for complete search history.

(56) References Cited

U.S. PATENT DOCUMENTS

| | | | |
|---|---|---|---|
| 3,887,312 A | 6/1975 | Seary | |
| 4,082,226 A | 4/1978 | Appleman et al. | |
| 4,427,361 A | 1/1984 | Saito | |
| 4,437,488 A | 3/1984 | Taggart et al. | |
| 4,643,665 A * | 2/1987 | Zeiger | 425/563 |
| 4,677,327 A | 6/1987 | Kushida et al. | |
| 5,030,076 A | 7/1991 | Ebenhofer | |
| 5,067,893 A * | 11/1991 | Osuna-Diaz | 425/564 |
| 5,225,217 A | 7/1993 | Wisen et al. | |
| 5,364,252 A | 11/1994 | Hlavaty et al. | |
| 5,364,394 A | 11/1994 | Mehl | |
| 5,975,870 A | 11/1999 | Remongin | |
| 6,124,648 A | 9/2000 | Shibuya et al. | |
| 6,227,835 B1 | 5/2001 | Bazzica | |
| 6,240,897 B1 | 6/2001 | Han | |
| 6,287,107 B1 | 9/2001 | Kazmer et al. | |
| 6,309,208 B1 | 10/2001 | Kazmer et al. | |
| 6,464,909 B1 | 10/2002 | Kazmer et al. | |
| 6,546,945 B2 | 4/2003 | Ishigaki et al. | |
| 2005/0100625 A1 * | 5/2005 | Tooman et al. | 425/145 |

FOREIGN PATENT DOCUMENTS

| | | |
|---|---|---|
| CA | 2366321 A2 | 7/2001 |
| JP | 4067926 | 3/1992 |
| JP | 4067926 A2 | 3/1992 |
| JP | 4067927 | 3/1992 |
| JP | 4067927 A2 | 3/1992 |
| JP | 7016892 | 1/1995 |
| JP | 7016892 A2 | 1/1995 |
| JP | 200061995 | 2/2000 |
| JP | 200061995 A2 | 2/2000 |
| JP | 2001-193596 | 7/2001 |
| JP | 2001193596 | 7/2001 |

OTHER PUBLICATIONS

International Search Report for PCT/CA2006/000306, dated Jun. 6, 2006, four pages, related to the above-identified US patent application.

* cited by examiner

*Primary Examiner*—Tim Heitbrink

(57) ABSTRACT

Disclosed herein is a molten molding material dispenser for use in a molding machine and/or molding machine assemblies. The dispenser includes an outlet body defining an outlet, and also includes an outlet cover being operatively movable relative to the outlet, any one of the outlet body, the outlet cover and any combination thereof being magnetically movable, the outlet body and the outlet cover being mechanical-actuation disengaged.

63 Claims, 7 Drawing Sheets

MOLTEN MOLDING MATERIAL DISPENSER

FIELD OF THE INVENTION

The present invention generally relates to molding machines, and more specifically to a molten molding material dispenser used in molding machines and/or molding machine subassemblies such as molding assemblies and hot runner assemblies for example.

BACKGROUND

Known molten molding material dispensers, also called valves or nozzles, include an outlet body defining an outlet and an outlet cover (such as a stem, a pin, a disk or a ball) that may be moved or displaced relative to the outlet so as to disable or enable flow of a molten molding material from the outlet. Such dispensers are used in molding machines, hot runner assemblies and/or molding assemblies. Movement of the outlet cover may be realized by having a mechanical actuation structure contact, urge and move the outlet cover. The mechanical actuation structure may include a spring, an air actuator, a hydraulic actuator, etc, either individually or in suitable combination. Such mechanical actuation structures may experience a short life span due to mechanical wear, may corrode due to exposure to the molten molding material, may undergo frequent maintenance and/or may experience inadvertent failure during molding machine operation.

U.S. Pat. No. 4,427,361 discloses a spring-actuated dispenser. Known spring-actuated dispensers may potentially experience difficulty shutting off the flow of molten molding material due to premature mechanical breakdown of the mechanical actuation structure. The spring may inadvertently restrict flow of molten molding material, and may also cause contamination of the molten molding material in the form of material hang-ups.

U.S. Pat. Nos. 6,287,107, 6,343,935 and 6,228,309 disclose hydraulic-, air- and electronic-actuated dispensers. Known air- and hydraulic-actuated dispensers may include mechanical actuation components that are subject to wear and thereby may inadvertently leak molten molding material from the dispenser. This may undesirably hamper dispensing operation, require frequent maintenance, and/or lead to loss of molten molding material. It is known that 75% of the molding machine operating cost is attributed to the cost of the molding material and any wasted molding material represents an unrecoverable cost.

U.S. Pat. Nos. 4,437,488 and 5,364,252 disclose a dual-actuated molten plastic dispenser that combines mechanical-actuation components with magnetic-actuation components. This dispenser requires both mechanical-actuation components and magnetic-actuation components in operable combination. When the mechanical actuation components fail to operate, this dispenser may fail to operate altogether as a unit because the mechanical actuation components are subject to premature wear.

Therefore, a solution is desired which addresses, at least in part, the above-mentioned shortcomings and/or other potential shortcomings.

SUMMARY

According to an aspect of the present invention, there is provided a molten molding material dispenser, including an outlet body defining an outlet; and an outlet cover being operatively movable relative to the outlet, any one of the outlet body, the outlet cover and any combination thereof being magnetically movable, the outlet body and the outlet cover being mechanical-actuation disengaged.

According to another aspect of the present invention, there is provided a molding machine hot runner assembly, including a hot runner body defining a hot runner passageway therein; and a molten molding material dispenser cooperating with the hot runner passageway, including an outlet body defining an outlet; and an outlet cover being operatively movable relative to the outlet, any one of the outlet body, the outlet cover and any combination thereof being magnetically movable, the outlet body and the outlet cover being mechanical-actuation disengaged.

According to yet another aspect of the present invention, there is provided a molding machine mold assembly, including a mold body defining a mold body passageway therein; and a molten molding material dispenser cooperating with the mold body passageway, including: an outlet body defining an outlet; and an outlet cover being operatively movable relative to the outlet, any one of the outlet body, the outlet cover and any combination thereof being magnetically movable, the outlet body and the outlet cover being mechanical-actuation disengaged.

According to yet again another aspect of the present invention, there is provided a molding machine, including a base; and any one of a mold assembly, a hot runner assembly and any combination thereof cooperating with the base, the mold assembly defining a mold assembly passageway therein, the hot runner assembly defining a hot runner assembly passageway therein; a molten molding material dispenser cooperating with any one of the mold assembly passageway, the hot runner assembly passageway and any combination thereof, including: an outlet body defining an outlet; and an outlet cover being operatively movable relative to the outlet, any one of the outlet body, the outlet cover and any combination thereof being magnetically movable, the outlet body and the outlet cover being mechanical-actuation disengaged.

According to yet again another aspect of the present invention, there is provided a molding machine, including a base; a barrel assembly cooperating with the base, defining an internal chamber therethrough, and having a barrel distal end presenting a molten molding material exit therefrom; a plasticizing screw cooperating with the barel, and having a plasticizing screw distal end; a molten molding material dispenser cooperating with any one of the plasticizing screw distal end, the molten molding material exit and any combination thereof, including: an outlet body defining an outlet; and an outlet cover being operatively movable relative to the outlet, any one of the outlet body, the outlet cover and any combination thereof being magnetically movable, the outlet body and the outlet cover being mechanical-actuation disengaged.

According to yet again another aspect of the present invention, there is provided a molten molding material dispensing method, including magnetically moving any one of an outlet body defining an outlet and an outlet cover relative to one another, any one of the outlet body, the outlet cover and any combination thereof being magnetically movable, the outlet body and the outlet cover being mechanical-actuation disengaged.

BRIEF DESCRIPTION OF THE DRAWINGS

A better understanding of the embodiments may be obtained with reference to the following drawings and detailed description of the embodiments, in which.

Similar references are used in different figures to denote similar components.

DETAILED DESCRIPTION OF THE EMBODIMENTS

Figure 1:
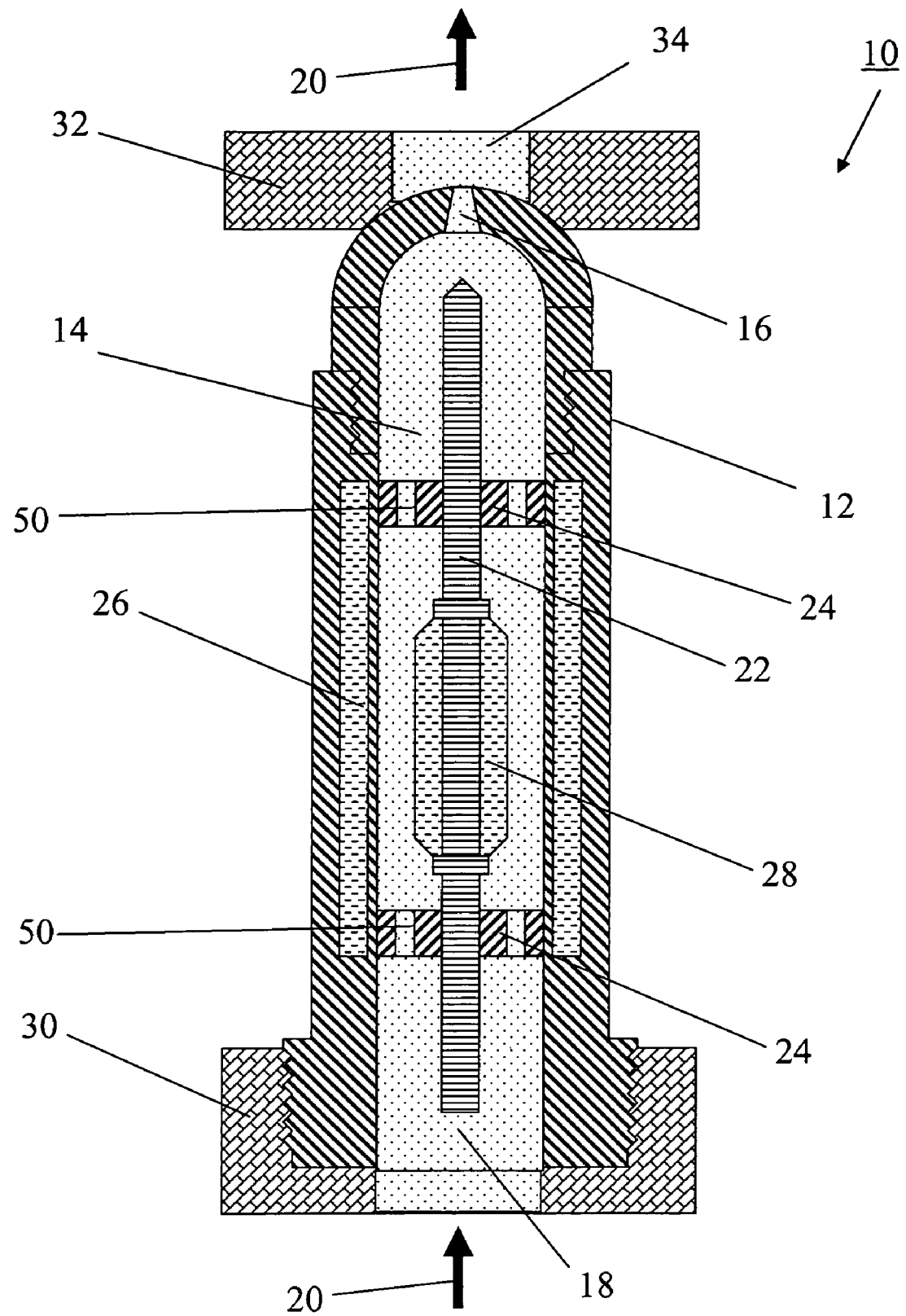
FIG. 1 is a cross-sectional view of a molten molding material dispensing device (MMMD) according to a preferred embodiment.

FIG. 1 a cross-sectional view of a molten molding material dispenser (MMMD) 10 according to a preferred embodiment. In general terms, the MMMD 10 includes an outlet body 12 (which may be also called a housing) that defines an outlet 16 (which may be called an egress end 16 or an egress outlet 16) or defines another outlet 18 (which may also be called an ingress outlet 18 or ingress end 18). The MMMD 10 also includes an outlet cover 22 (which may be also called a stem 22) which is operatively movable relative to the outlet 16 or the outlet 18. Any one of the outlet body 12, the outlet cover 22 and any combination thereof may be magnetically movable, as will be described in more detail further below. The outlet body 12 and the outlet cover 22 are mechanical-actuation disengaged, in that the outlet body 12 and the outlet cover 22 are not operatively mechanically connected to a mechanical-actuation component (such as a spring member for example) so that the outlets 16 or 18 relative to the outlet cover 22 not by means of mechanical-actuation structures but by means of magnetic-actuation structures. The MMMD 10 is exclusively magnetically movably actuated by magnetic-actuation structure or components without having to rely on mechanical-actuation components, such as springs for example, for moving the outlet cover 22 and the outlet body 12 relative to each other in any combination). In this fashion, the outlet body 12 and the outlet cover 22 are not mechanically movably actuated by mechanical-actuation components. Under this arrangement, the MMMD 10 is less likely to inadvertently fail due to failure of mechanical-actuation components since these mechanical-actuation components are not used by the MMMD 10 in a process of actuating or moving the outlet body 12 and/or the outlet cover 22 relative to one another.

The MMMD 10 may also be called a valve 10 which valves molten molding material such as molten plastic for example. For sake of simplicity, the MMMD 10 will now be referred to at the valve 10. The valve 10 may be used in many applications such as, but not limited to, hot runner assemblies, mold assemblies, and/or molding machines. The valve 10 may be commonly referred to as a nozzle, and the nozzle is used for handling fluid in the form of a molten injection material, such as molten plastic for example. It will be appreciated that the valve 10 may, in use, regulate or control the flow of the flowing fluid material (hereinafter referred to as the "fluid") such as, for example, gases, liquids and/or loose materials by opening or obstructing ports or passageways (i.e., the egress end 16 or the ingress end 18) so as to start and/or stop the flow of the flowing fluid.

The valve 10 includes a housing which forms a fluid flowing channel 14 that extends through the housing from the ingress end 18 (i.e., an input port member) to the egress end 16 (i.e., a discharge port member) which are located on opposite ends of the housing. A direction 20 indicates flow of fluid through the housing from the ingress end 18 to the egress end 16. The ingress end 18 and the egress end 16 may be referred to generally as port members (or outlets) that define a port therethrough. These port members include a seat member attached to the port members as can be seen in FIG. 1.

The housing may include a stem 22 operatively movable relative to the egress end 16. The stem 22 may be referred to generally as a seat sealing member because the stem 22 may seal against the seat member connected to a port member sufficiently so to prevent the passage of fluid through the port member. The stem 12 is shown aligned coaxially alone a longitudinal axis of the housing so that the stem 22 moves in a sliding configuration towards and away from the egress end 16. A pair of standoffs 24 may be used to keep the stem 22 in operable movable position relative to the egress end 16. The stem 22 may move slidably through the pair of standoffs 24 and along the longitudinal axis of the housing relative to the egress end 16 in a reciprocating manner. The pair of standoffs 24 may form passageways or openings 50 which may permit uninhibited passage of fluid through the standoffs 24. The stem 22 may be magnetically conveyable in that the stem 22, when having magnetically compatible properties, may become movable upon receipt of a sufficiently predetermined amount of magnetic flux that may be applied to the stem 22. It is understood that "magnetically conveyable" means that the stem 22 may be magnetically attracted and/or magnetically repelled, and/or the egress end 16 may be magnetically attracted and/or magnetically repelled. The stem 22 may be urged or conveyed magnetically so that eventually the magnetically-conveyed stem 22 may substantially seal against the egress end 16, and in this fluid blocking position, passage of the fluid may be substantially prevented from the egress end 16. It is optional as to whether the egress end 16 has magnetically-compatible properties. The egress end 16 may remain stationary relative to the housing and the stem 22. In operation, the stem 22 may be magnetically conveyed so that the magnetically conveyed stem 22 may become offset or spaced apart from the egress end 16 so that the offset stem 22 permits passage of the fluid from the egress end 16. The valve 10 may include fewer mechanical parts which may result in lower maintenance.

The stem 22 may be made of non-magnetically compatible material such as non-magnetic plastic or metallic material and the like. A portion of the egress end 16 of the housing may have magnetically-compatible properties so that the egress end 16 may be magnetically conveyed relative to the stem 22. It will be appreciate that the stem 22 may remain non-moving while the egress end may move, or a combination of both the stem 22 and the egress end 16 may move. The housing may be adapted depending on the magnetic-compatible properties of the stem 22 and the egress end 16 and on whether the relative movement of the stem 22 and the egress end 16. Magnetically compatible material may interact, co-operate, attract, repel, generate and/or sink magnetic lines of flux or force and in some way become influenced by magnetism, while non-magnetically compatible material is not.

The valve 10 may optionally include a permanent magnet 28 attached to the stem 22 in which the combination of the stem 22 and the permanent magnet 28 may improve the ability of the stem 22 to become more easily moved by a predetermined application of magnetic flux or magnetic lines of force. The valve 10 may optionally include a magnetic flux generator 26 which may be located in co-operating arrangement with the stem 22, and when energized the magnetic flux generator 22 may provide sufficient magnetic flux to convey the stem 22 towards and/or away from the egress end 16. By way of example, the magnetic flux generator 26 may be a solenoid, a magnet and/or a combination thereof provided that a magnetic flux may be generated which urges the stem 22 to move. The magnetic flux generator 26 is shown embedded into a side wall of the housing. The generator 26 may completely or partially encircle the stem 22 as needed. In operation, the magnetic flux generated by the magnetic flux generator 26 may penetrate the housing and reach the stem 22 in an operative fashion.

The stem 22 may be configured in a variety of ways while remaining influenced by the magnetic flux generator 26. For example, the permanent magnet 28 may be integral with and/or placed in-line with the stem 22. The permanent magnet 28 may be placed anywhere along the stem 22 to improve the movement of the stem 22. The stem 22 may be used without the permanent magnet 28 provided that the stem 22 is made of sufficiently magnetically-susceptible material (such as steel for example) so that the stem 22 is sufficiently susceptible to being conveyed or moved by the magnetic flux generator 26 without having the permanent magnet 28 being attached to the stem 22.

The magnetic flux generator 26 may be repositioned in a variety of configurations. For example, the magnetic flux generator 26 may be placed on the peripheral outer surface of the housing, may be placed along the inside wall of the housing, or may be placed any where between the inside and outside walls of the housing provided that the generated magnetic flux may reach the stem 22. Optionally, for example, the flux generated may reach the egress end 16 and then move the egress end 16 to the stem 22. The magnetic flux generator 26 and the valve 10 may be sold separately and installed in a cooperative manner by an end user.

The ingress end 18 may be operatively connected to a hot runner assembly 30 or may be connected to a barrel of an injection molding machine (also depicted as item 30) so that either connection in operation may deliver the molten plastic to the ingress 18. The egress end 16 may be operatively connected to a mold gate 34 of a mold stack 32 so that the valve 10 may selectively convey the molten plastic to the mold gate 34 when the stem 22 becomes magnetically conveyed to a fluid non-blocking position in which the stem 22 becomes offset from the egress end 16.

Figures 2, 3:
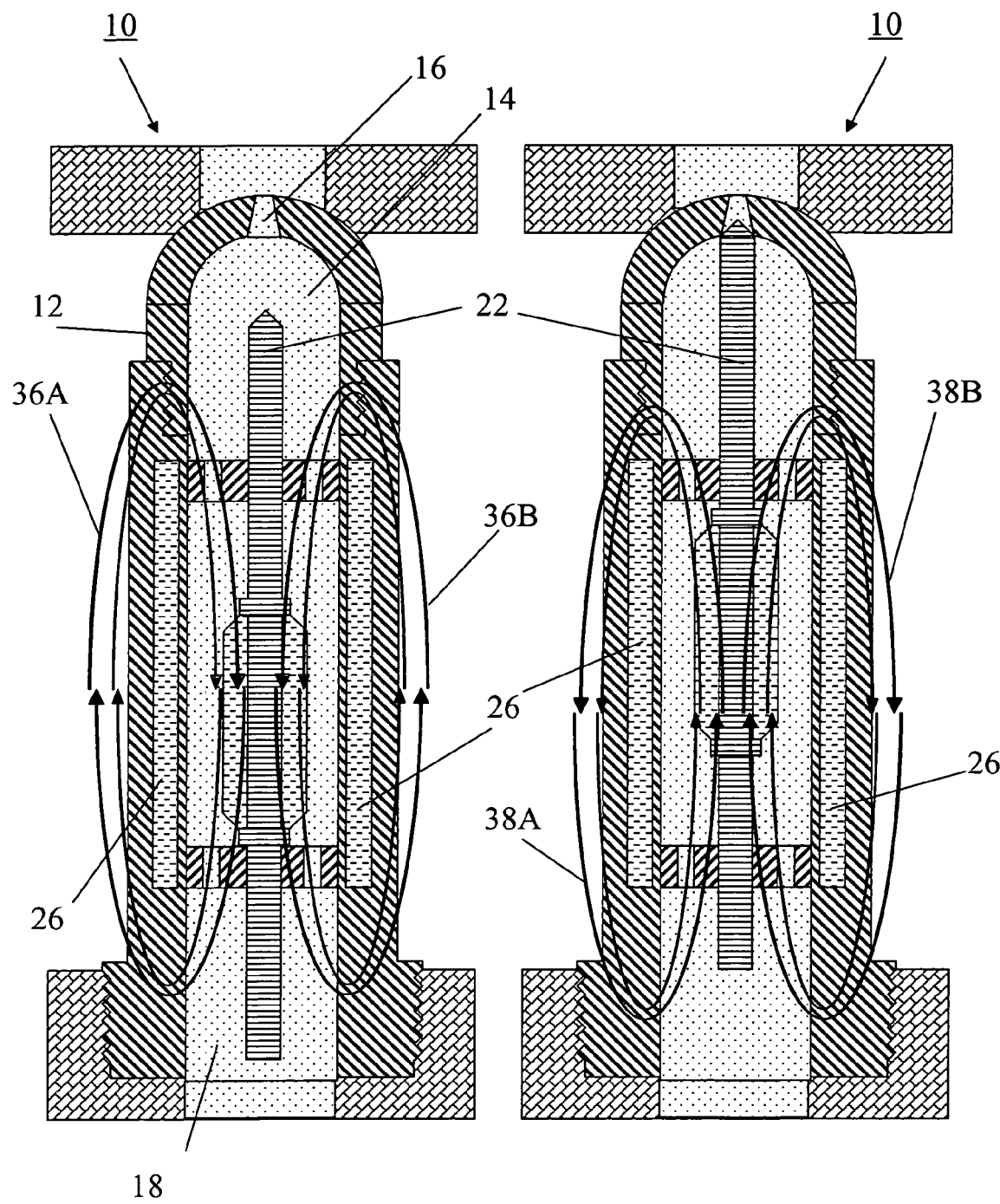
FIG. 2 is a cross-sectional view of the MMMD of FIG. 1 in a fluid non-blocking position.
FIG. 3 is a cross-sectional view of the MMMD of FIG. 1 in a fluid blocking position.

FIG. 2 is a cross-sectional view of the MMMD 10 (the valve 10) of FIG. 1 in a fluid non-blocking position. The magnetic flex generator 26 is shown in an energized state in which the generator 26 may apply (on the one side of the housing) magnetic flux 36A and applies magnetic flux 36B (on the other side of the housing). The magnetic flux 36A and 36B completes a magnetic circuit having applied flux which travels from the egress end 16 towards the ingress end 18 along the fluid flow channel 14 and then travels from the ingress end 18 back to the egress end 16 (substantially outside of the fluid flow channel 14). Since the stem 22 may be magnetically conveyable, the magnetic flux 36A and 36B may magnetically urge or convey the stem 22 to, move towards the ingress end 18. The magnetically-conveyed stem 22 is shown in the fluid non-blocking position in which the stem 22 is offset from (or spaced apart from) the egress end 16 which thus permits passage of the fluid through the egress end 16.

FIG. 3 is a cross-sectional view of the MMMD 10 (the valve 10) of FIG. 1 in a fluid blocking position. The magnetic flex generator 26 is shown in another energized state in which it applies (on the one side of the housing) magnetic flux 38A and applies magnetic flux 38B (on the other side of the housing). The magnetic flux 38A and 36B completes a magnetic circuit having applied magnetic flux which travels from the egress end 16 towards the ingress end 18 substantially outside of the fluid flow channel 14 and then travels from the ingress end 18 back to the egress end 16 substantially inside of the fluid flow channel 14). Since the stem 22 is magnetically conveyable, the magnetic flux 38A and 38B may magnetically convoy the stem 22 to move towards the egress end 16. The magnetically-conveyed stem 22 is shown in the fluid blocking position in which the stem 22 may become sealed against the egress end 16 in which the passage of the fluid may become substantially blocked or prevented from flowing.

In a reconfiguration, the stem 22 and the egress end 18 cooperate in which the stem 22 is magnetically attracted and/or magnetically repelled towards and/or away from the ingress end 18 so that the hot melt or molten plastic may be blocked from entering the housing of the valve 10.

It will be appreciated that, in broad terms, the valve 10 operates under a method of valving that includes any one of magnetically movably attracting and magnetically movably repelling any one of a stem and a valve egress end to any one position of being in contact with and being spaced apart from each other, any one of the stem and the egress end being any one of movably magnetically attractable and movably magnetically repellable. The valving method of the valve 10 may help to reduce the number of parts use in the construction of the valve 10, may improve operational reliability, may increase life expectance and may reduce ongoing maintenance. It will be appreciated that the parts of the valve 10 may be configured in many ways which satisfy the valving method of the valve 10 described above.

The valve 10 may be configured so that where the pressure from the molten plastic or plastic melt during an injection cycle may be used to shift the stem 22 towards an open position, and magnetic forces (either magnetic attraction or repulsion forces) is applied to shift the stem 22 to a closed position (that is, the stem 22 seals against a seat member). This configuration may be useful in nozzle shut off applications and in hot runner applications.

Figures 4, 5:
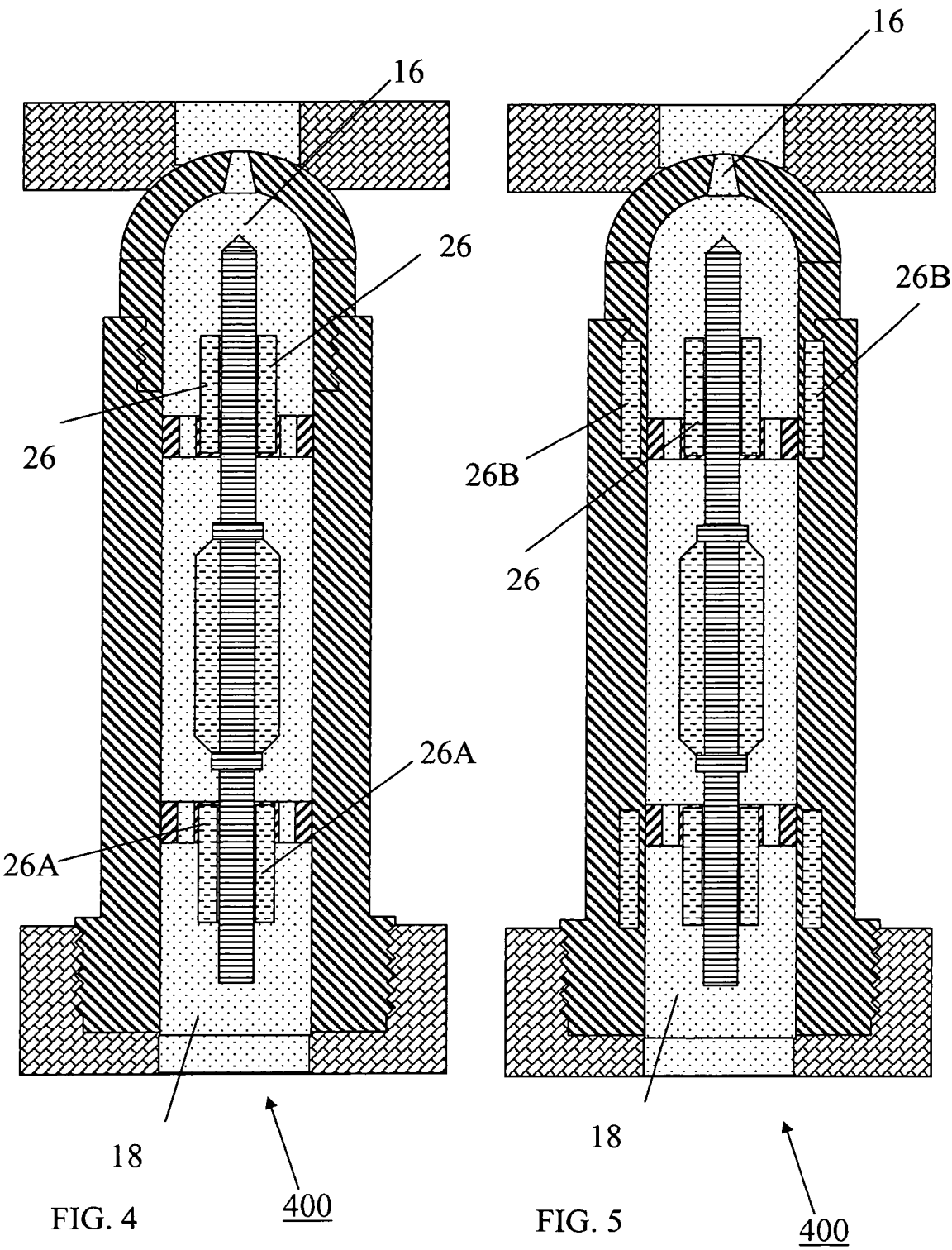
FIG. 4 is a cross-sectional view of a MMMD according to an alternative embodiment.
FIG. 5 is a cross-sectional view of the MMMD of FIG. 4 showing additional structure.

FIG. 4 is a cross-sectional view of an MMMD 400 (a valve 400) according to an alternative embodiment. The flux generator 26 may be installed near the egress end 16. Another magnetic flux generator 26A may be installed to co-operate with the stem 22 at the ingress end 18. Now when the magnetic flux generator 26 becomes de-energized and the another magnetic flux generator 26A becomes energized the another flux generator 26A may magnetically move the stem 22 from a position oppositely moved by the magnetic flux generator 26. In this manner, alternating the energizing of the generators 26 and 26A may urge the stem 22 to reciprocate between the fluid non-blocking position and the fluid blocking position.

FIG. 5 is a cross-sectional view of the MMMD 400 (the vlave 400) of FIG. 4 showing additional structure. The valve 400 may include a magnet energizing source 26B operatively coupled with the magnetic flux generator 26 via magnetic flux induction (much like a transformer). When the magnet energizing source 26B becomes activated, the magnet energizing source 26B may energize the magnetic flux generator 26. This arrangement may permit the possibility of avoiding the running of electrical power lines through the housing which makes for a simpler configuration having less chance for valve failure. Also, the magnetic source 26B may be used to bolster the flux strength of the magnetic source 26 in addition to, or instead of, energizing the magnetic source 26.

Figure 6:
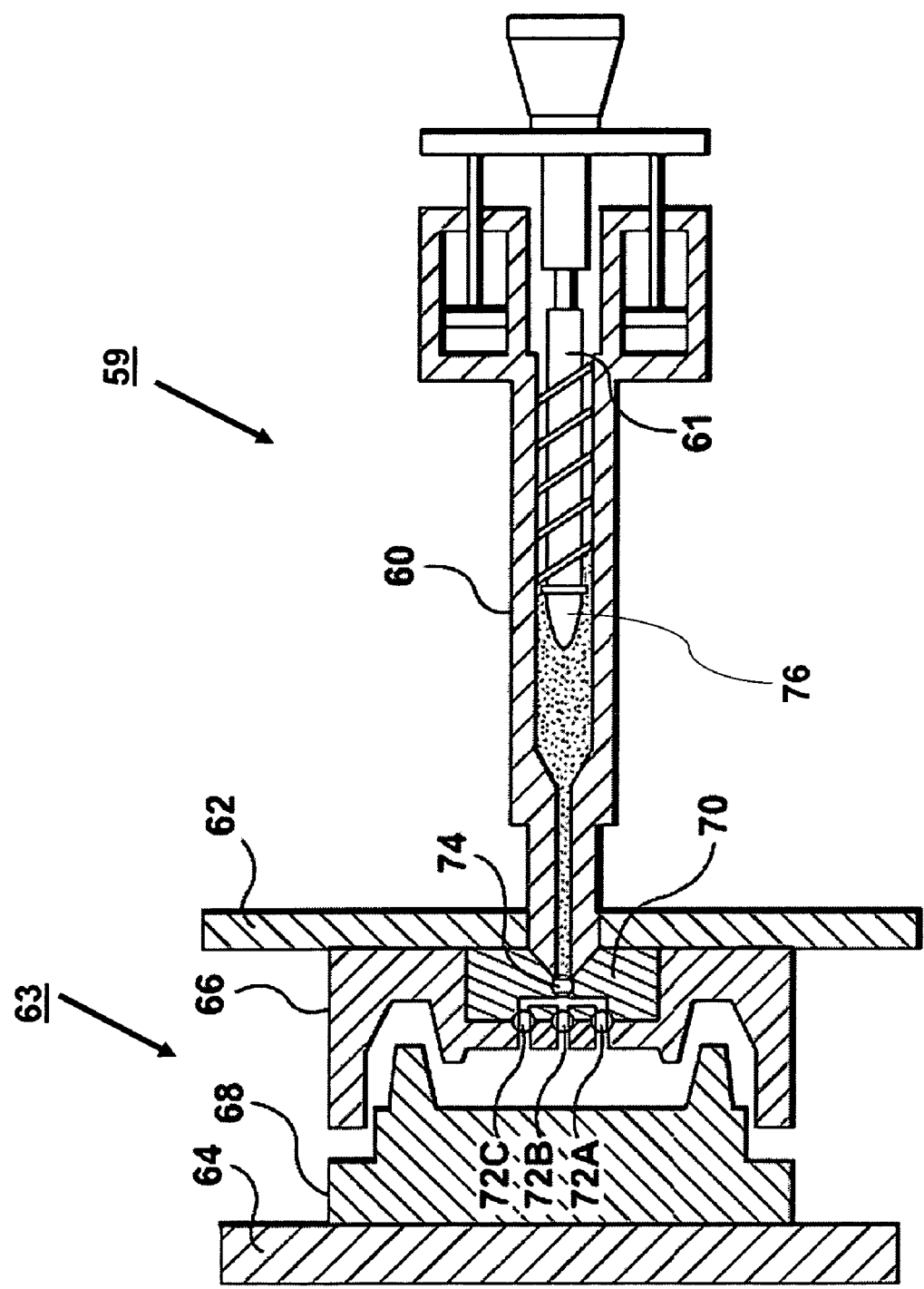
FIG. 6 is a cross sectional view of a molding machine system and molding machine assemblies using the MMMD of FIGS. 1 and 4.

FIG. 6 is a cross sectional view of a molding machine system 59 and molding machine assemblies using the MMMD 10 and/or 400 of FIGS. 1 and 4 respectively. The molding machine 59 may be, for example, an injection-type molding machine such as the Hylectric™ injection molding machine manufactured by Husky Injection Molding Systems Ltd of Bolton, Ontario, Canada. The valve 10 may be adapted for use in many types of molding machines. The molding machine 59 includes a base (not depicted). A barrel assembly 60 is attached to the base. The barrel assembly 60 defines an internal chamber therethrough, and has a barrel distal end presenting a molten plastic exit therefrom. A rotatable plasticizing screw 61 cooperates with the internal chamber of the barrel assembly, and has a plasticizing screw distal end offset from the molten plastic exit of the barrel assembly.

A molding assembly 63 includes a fixed platen 62 having a passageway therethrough permitting entrance of the barrel distal end therethrough. The molding assembly 63 also includes a movable platen 64 which moves relative to the fixed platen 62. Fixedly mounted on the movable platen 62 is a first mold portion 68 defining an inner mold cavity therein. Fixedly mounted on the fixed platen is a second mold portion 66 defining a mold core surface which mates with the mold cavity therewith. It will be appreciated that the second mold surface may define the mold cavity while the first mold portion defines the mold core surface. The molding assembly 63 may also include a hot runner assembly 70. The second mold portion 66 defines a mold body molten plastic passageway therein. The hot runner assembly 70 defines a hot runner assembly molten plastic passageway therein.

The valve 10 may be installed at positions 72A, 72B and 72C in which in these positions, the valve cooperates with the mold body molten plastic passageway. The valve 10 may be installed at position 74 in which in this position the valve cooperates with the hot runner assembly molten plastic passageway. Position 74 may be the distal end of the barrel 60 or may be a mold gate associated with the molding assembly 63. The valve 10 may also be installed at the distal end of the barrel 60 assembly. A modified version of the valve 10 may also be installed at valve position 76. The modified version will be described further below.

It will be appreciated that the molding system 59 may be provided separately from the molding assembly 63 and the hot runner assembly 74, or may be provided with the molding assembly 63 without the hot runner assembly 74, or may be provided with the hot runner assembly 74 without the mold assembly 63.

Figure 7:
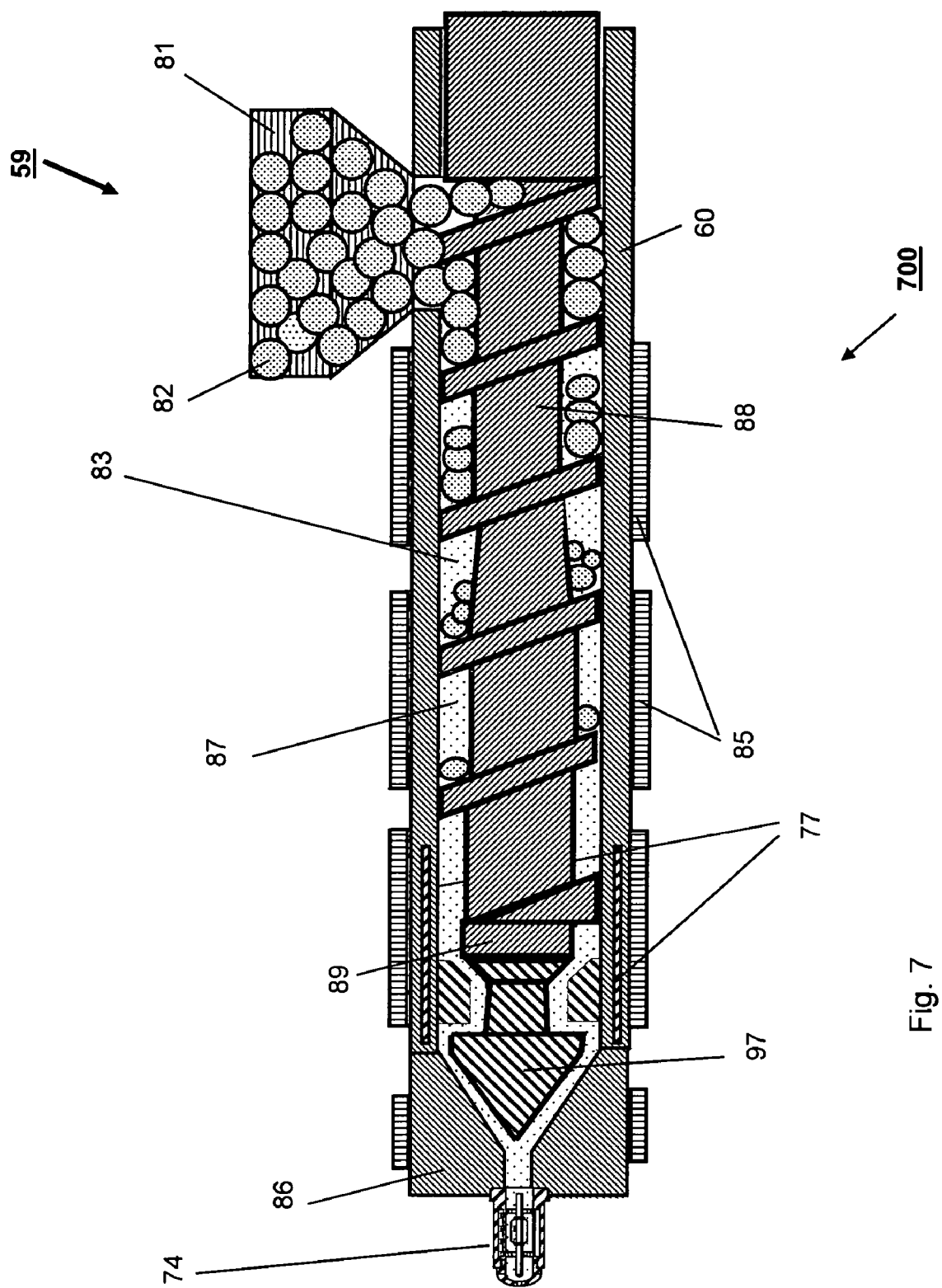
FIG. 7 is a cross sectional view of an MMMD according to yet another alternative embodiment.

FIG. 7 is a cross sectional view of an MMMD 700 (a valve 700) according to yet another alternative embodiment. The MMMD 700 is installed in a barrel of a molding machine 59. The machine 59 includes a hopper assembly 81 in which plastic pellets 82 are placed therein. The hopper assembly 81 is attached to the barrel assembly 60. The barrel assembly 60 defines an interior chamber 87 that extends from one end to another end of the barrel assembly 60, and includes a barrel distal end 86. The distal end 86 defines an exit through which molten plastic may flow from the interior chamber of the barrel assembly. Operatively mounted in the barrel assembly 60 is a plasticizing screw 88 so that the screw 88 may be rotated by a screw drive assembly (not depicted). As the plasticizing screw 88 is rotated, the plastic pellets are transformed into molten plastic 83 and the molten plastic 83 is conveyed towards a screw distal end 89 of the screw 88. The barrel assembly also includes heater bands 85 which are wrapped around the outer peripheral covering of the barrel assembly 60. The heater bands 85 keep the molten plastic 83 heated or warmed when the screw 88 is not rotated. Rotation of the screw 88 causes the plastic pellets 82 to heat and melt which forms the molten plastic 83.

Mounted on the screw distal end 89 is a modified version 97 of the valve 700 which is shown as position 76.

Figure 8A:
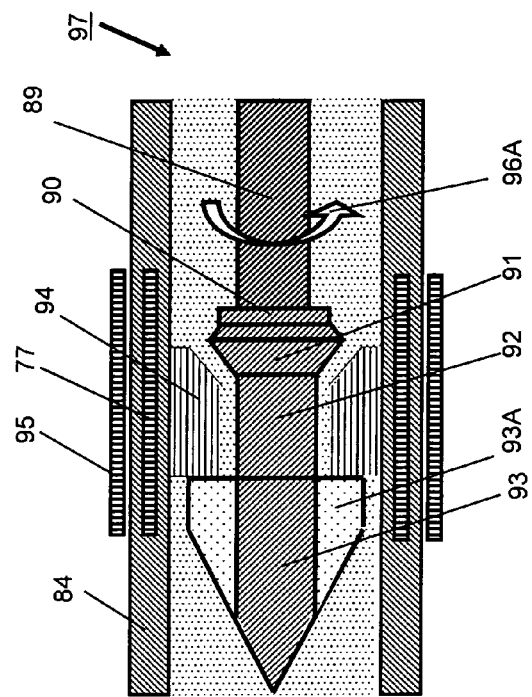
FIGS. 8A, 8B and 8C are cross sectional views of a MMMD of FIG. 7.
Figure 8C:
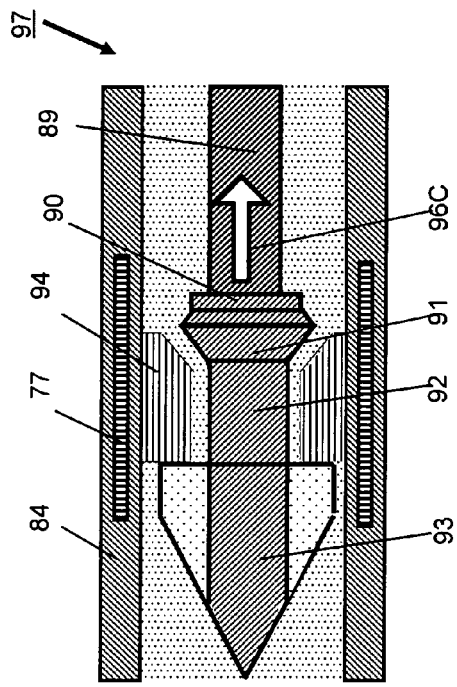
Figure 8B:
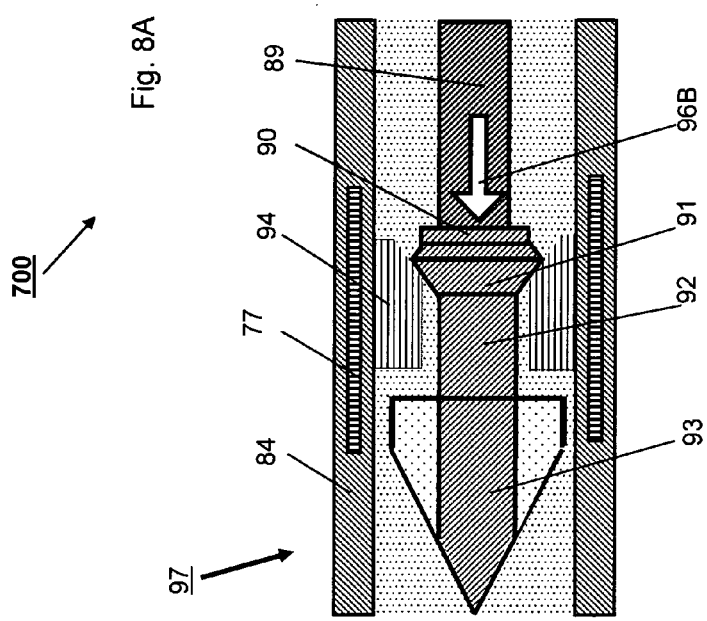

FIGS. 8A, 8B and 8C are cross sectional views of the MMMD 700 of FIG. 7.

FIG. 8A is a cross sectional view of the modified version 91. Hereinafter the modified version 91 (the MMMD 700) will be referred to as the check valve 97. The check valve 97 includes a base 90 detachably attaching to the screw distal end 89 of plasticizing screw 88. The base 90 may be detached from the distal end 89 so that a replacement modified version 91 may be used in place of the modified version 91. A seat member (or seat) 91 attaches to the base 90 and faces generally towards the distal end 86 of the barrel 60. Extending from the seat member 91 is a stem portion 92. The stem portion 92 has a diameter which is less than the inside diameter of the interior chamber 87 of the barrel 60. Attaching to the stem portion 91 is a head 93 which has a diameter which is generally larger than the stem portion 91. The head 93 includes a groove portion 93A which permits unimpeded passage of the molten plastic through the head 93. The check valve 97 is somewhat similar to the check valve as is disclosed in U.S. Pat. No. 6,115,816 (Urbanek et al) but operates differently according to this description. Surrounding the stem portion 92 is a ring 94. The ring 94 is offset from the stem portion 91 so as to define a passageway between the stem portion 91 and the ring 94 which permits the movement of the molten plastic 83 through the check valve 97. Installed in the barrel assembly is a magnetic generator 77 which moves, when energized, the ring 94 towards the seating member 91 so that the ring 94 may seal against the seat member 91. In this way, the ring 94 performs as a seat sealing member. Also shown is another position (95) for the magnetic generator which is on the outer surface of the barrel assembly 80. Alternatively, item 95 may be an energizing magnetic generator which energizes the magnetic generator 77 as an alternative to installing conventional electrical power wiring into the side wall of the barrel assembly 60. The ring 94 may include a permanent magnet or solenoid which interacts with the magnetic generator 77. The ring 94 may be made of magnetically attractable material such as iron for example. The magnetic generator 77 may be a permanent magnet or solenoid.

During a recovery cycle of the molding machine 59, the plasticizing screw 88 is rotated in a direction 96A so that the rotating screw 88 pushes the molten plastic 83 forwardly towards the distal end 86 of the barrel assembly 60. During this cycle, a shot of molten plastic is being accumulated between the distal end 86 and the base 90 of the check valve 97. The size of the shot is an important aspect of the molding machine 59. A shot size that is too small may result in an unacceptable molded article molded in the molding assembly 63. A shot size that is too large may result in an increased consumption of plastic pellets 82. By controlling when the check valve shuts off, and controlling how quickly the check valve 97 shuts off may provide an important advantage to the operation of the molding machine 59.

FIG. 8B is a cross sectional view of the check valve 97 during a fill and hold cycle of the molding machine 59, in which the plasticizing screw 88 is no longer rotated, but is pushed forwardly towards the distal end 86 of the barrel assembly 60. Direction 96B indicates the direction in which the screw 88 is moved or translated. As a result of this forward movement of the screw 88, the seat member 91 is urged against the ring 94. To improve the closure of the seat member against the seat sealing member, the magnetic energizer 77 energizes and magnetically urges (either by magnetic attraction or magnetic repulsion) the ring 94 to slide along the inner wall surface of the barrel assembly 60 towards the seat member 91 and ultimately to seal against the seat member 91. This action may permit faster closing of the check valve 97 which may lead to repeatable development of shot sizes for subsequent shot recovery cycles. Both the forward movement of the screw 88 and the magnetic urging of the ring 94 in the opposite direction can be performed simultaneously. Alternatively, the magnetic urging of the ring 94 towards the seat member 91 may be performed without having to move the screw 88 forwardly. This may lead to a quicker overall cycle time which then may permit the construction of more molded articles per minute of operation of the molding machine 59.

FIG. 8C is another cross sectional view of the check valve 97 during a pull-back cycle of the molding machine 59, in which the screw 88 is pulled back along direction 96C so that the seat member 91 and the ring 94 (the seat sealing member) may be separated so that additional molten plastic may once again flow past the distal end 89 of the screw 88. The magnetic energizer 77 may magnetically urge the ring 94 towards the distal end 86 of the barrel assembly 60 while the screw 88 is pulled backwardly. This action may help in separating the seat member 91 from the ring 94 and prevent inadvertent jamming of the ring 94 against the seat member 91. Alternatively, the ring 94 may be magnetically urged towards the distal end 86 of the barrel assembly 60 without having to urge the screw 88 backwardly which may lead to a quicker overall cycle time which then may permit the construction of more molded articles per minute of operation of the molding machine 59.

Figure 9A:
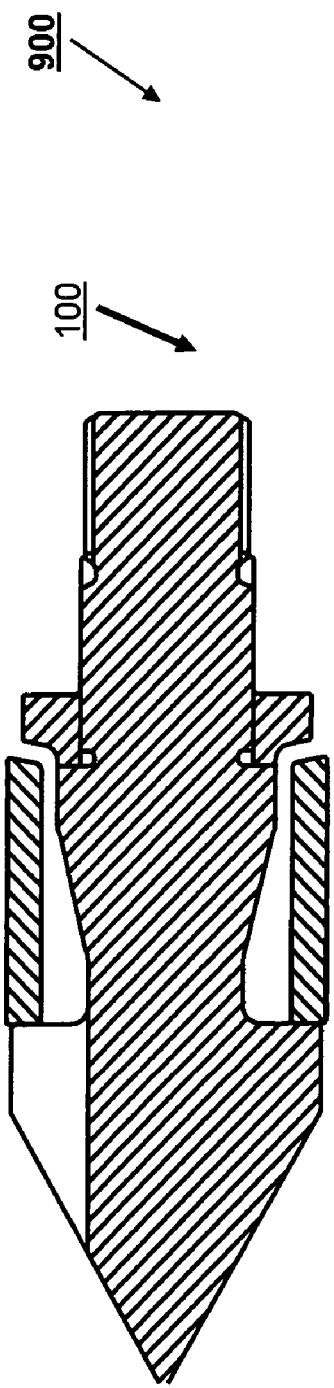
FIGS. 9A and 9B are cross sectional views of an MMMD according to yet another alternative embodiment.
Figure 9B:
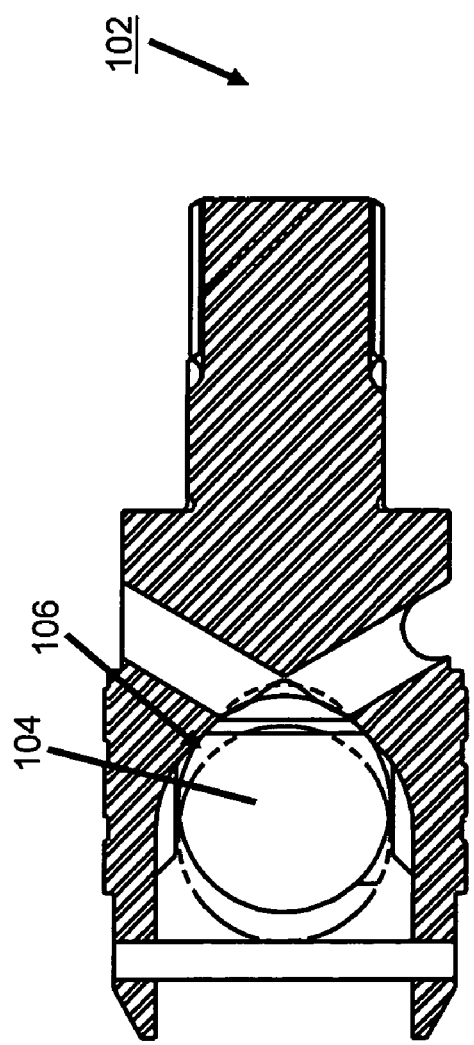

FIGS. 9A and 9B are cross sectional views of an MMMD 900 according to yet another alternative embodiment.

FIG. 9A is a cross sectional view of a free flow ring check valve 100 which may be adapted to operate along the principles of the check valve 97. While the form is different than that of the check valve 97, the check valve 100 may be adapted accordingly to move under the influence of magnetism.

FIG. 9B is a cross sectional view of a flow ball check valve 102 which may be adapted to operate along the principles of the check valve 97. A ball 104 may be magnetically moved, urged or conveyed (that is, magnetically attracted and/or magnetically repelled or any combination thereof) to move so as to seal against a seat member 106. The ball 104 acts as the seat sealing member.

It will be appreciated that some elements may be adapted for specific conditions or functions. The concepts described above may be further extended to a variety of other applications that are clearly within the scope of the present invention. Having thus described the embodiments, it will be apparent to those skilled in the art that modifications and enhancements are possible without departing from the concepts as described. Therefore, what is intended to be protected by way of letters patent should be limited only by the scope of the following claims:

The invention claimed is:

1. A molten molding material dispenser, comprising:
an outlet body defining an outlet;
an outlet cover being mechanical-actuation disengaged, the outlet cover having a magnet being positionable proximate to:
   a magnetic flux generator, the outlet being any one of coverable and uncoverable in response to the magnetic flux generator generating magnetic flux configured to magnetically move the magnet and the outlet cover relative to the outlet, and
   another magnetic flux generator being offset from the magnetic flux generator and cooperating with any one of the outlet body, the outlet cover and any combination thereof, the another magnetic flux generator acts, in use, to any one of magnetically attract, magnetically repulse and any combination thereof, any one of the outlet body, the outlet cover and any combination thereof, to a position oppositely moved by the magnetic flux generator.

2. The molten molding material dispenser of claim 1, wherein:
the outlet cover is operatively movable relative to the outlet between a molten molding material flow disabled position in which the outlet is operatively covered by the outlet cover, and a molten molding material flow enabled position in which the outlet is operatively uncovered.

3. The molten molding material dispenser of claim 1, wherein:
any one of the outlet body, the outlet cover and any combination thereof includes any one of a permanent magnet, a solenoid and any combination thereof.

4. The molten molding material dispenser of claim 2, wherein:
in the molten molding material flow disabled position, the outlet and the outlet cover remain substantially in contact with each other to substantially prevent, in use, any flow of molten molding material through the outlet; and
in the molten molding material flow enabled position, the outlet and the outlet cover remain substantially spaced apart from one another to substantially permit, in use, a flow of molten molding material through the outlet.

5. The molten molding material dispenser of claim 1, wherein:
the magnetic flux generator cooperates with any one of the outlet body, the outlet cover and any combination thereof, the magnetic flux generator acts, in use, to any one of magnetically attract, magnetically repulse and any combination thereof any one of the outlet body, the outlet cover and any combination thereof.

6. The molten molding material dispenser of claim 5, wherein:
the magnetic flux generator is any one of a permanent magnet, a solenoid and any combination thereof.

7. The molten molding material dispenser of claim 5, further comprising:
an energizing magnetic generator cooperating with the magnetic flux generator, and when energized the energizing magnetic generator magnetically couples magnetic force lines into the magnetic flux generator, the coupled magnetic force lines energizing the magnetic flux generator.

8. The molten molding material dispenser of claim 1, further comprising:
a housing having a molten molding material flow channel extending therethrough from an ingress end to an egress end; and
a stem movable relative to the egress end;
wherein the outlet body is the housing,
wherein the outlet is any one of the egress end and the ingress end,
wherein the outlet cover is a distal end of the stem.

9. The molten molding material dispenser of claim 8, further comprising:
a standoff attaching to the housing within the molten molding material flow channel, wherein the stem is slidably cooperating with the standoff, and is movable towards and away from any one of the egress end, the ingress end and any combination thereof.

10. The molten molding material dispenser of claim 8, further comprising:
a barrel;
a base slidable within the barrel;
a stem member extending from the base, the outlet cover includes the distal end of the stem member; and
a ring surrounding the stem member and being offset therefrom, and coaxially slidable along the stem;
wherein the ring is the outlet cover,
wherein the combination of the barrel and the base is the outlet body,
wherein a space between the base and the ring defines the outlet.

11. The molten molding material dispenser of claim 1, wherein:
the outlet cover includes a seat sealing member; and
the outlet includes a seat surrounding the outlet, the seat being sealable by the seat sealing member.

12. The molten molding material dispenser of claim 1, wherein:
the magnetic flux is configured to any one of magnetically attractively move, magnetically repulsively move and any combination thereof the magnet and the outlet cover.

13. A molding machine hot runner assembly, comprising:
a hot runner body defining a hot runner passageway therein; and
a molten molding material dispenser cooperating with the hot runner passageway, including:
an outlet body defining an outlet; and
an outlet cover being mechanical-actuation disengaged, the outlet cover having a magnet being positionable proximate to:
a magnetic flux generator, the outlet being any one of coverable and uncoverable in response to the magnetic flux generator generating magnetic flux configured to magnetically move the magnet and the outlet cover relative to the outlet, and
another magnetic flux generator being offset from the magnetic flux generator and cooperating with any one of the outlet body, the outlet cover and any combination thereof the another magnetic flux generator acts, in use, to any one of magnetically attract, magnetically repulse and any combination thereof, any one of the outlet body, the outlet cover and any combination thereof, to a position oppositely moved by the magnetic flux generator.

14. The molding machine hot runner assembly of claim 13, wherein:
the outlet cover is operatively movable relative to the outlet between a molten molding material flow disabled position in which the outlet is operatively covered by the outlet cover, and a molten molding material flow enabled position in which the outlet is operatively uncovered.

15. The molding machine hot runner assembly of claim 13, wherein:
any one of the outlet body, the outlet cover and any combination thereof includes any one of a permanent magnet, a solenoid and any combination thereof.

16. The molding machine hot runner assembly of claim 13, wherein:
in the molten molding material flow disabled position, the outlet and the outlet cover remain substantially in contact with each other to substantially prevent, in use, any flow of molten molding material through the outlet; and
in a molten molding material flow enabled position, the outlet and the outlet cover remain substantially spaced apart from one another to substantially permit, in use, a flow of molten molding material through the outlet.

17. The molding machine hot runner assembly of claim 13, wherein:
the magnetic flux generator cooperates with any one of the outlet body, the outlet cover and any combination thereof, the magnetic flux generator acts, in use, to any one of magnetically attract, magnetically repulse and any combination thereof any one of the outlet body, the outlet cover and any combination thereof.

18. The molding machine hot runner assembly of claim 17, wherein:
the magnetic flux generator is any one of a permanent magnet, a solenoid and any combination thereof.

19. The molding machine hot runner assembly of claim 17, further comprising:
an energizing magnetic generator cooperating with the magnetic flux generator, and when energized the energizing magnetic generator magnetically couples magnetic force lines into the magnetic flux generator, the coupled magnetic force lines energizing the magnetic flux generator.

20. The molding machine hot runner assembly of claim 13, further comprising:
a housing having a molten molding material flow channel extending therethrough from an ingress end to an egress end; and
a stem movable relative to the egress end;
wherein the outlet body is the housing,
wherein the outlet is any one of the egress end and the ingress end,
wherein the outlet cover is a distal end of the stem.

21. The molding machine hot runner assembly of claim 20, further comprising:
a standoff attaching to the housing within the molten molding material flow channel;
wherein the stem is slidably cooperating with the standoff, and is movable towards and away from any one of the egress end, the ingress end and any combination thereof.

22. The molding machine hot runner assembly of claim 20, further comprising:
a barrel;
a base slidable within the barrel;

a stem member extending from the base, the outlet cover includes the distal end of the stem member; and a ring surrounding the stem member and being offset therefrom, and coaxially slidable along the stem;

wherein the ring is the outlet cover, wherein the combination of the barrel and the base is the outlet body, wherein a space between the base and the ring defines the outlet.

23. The molding machine hot runner assembly of claim 13, wherein:

the outlet cover includes a seat sealing member; and the outlet includes a seat surrounding the outlet, the seat being sealable by the seat sealing member.

24. The molding machine hot runner assembly of claim 13, wherein:

the magnetic flux is configured to any one of magnetically attractively move, magnetically repulsively move and any combination thereof the magnet and the outlet cover.

25. A molding machine mold assembly, comprising:

a mold body defining a mold body passageway therein; and a molten molding material dispenser cooperating with the mold body passageway, including:

an outlet body defining an outlet; and an outlet cover being mechanical-actuation disengaged, the outlet cover having a magnet being positionable proximate to:

a magnetic flux generator, the outlet being any one of coverable and uncoverable in response to the magnetic flux generator generating magnetic flux configured to magnetically move the magnet and the outlet cover relative to the outlet, and another magnetic flux generator being offset from the magnetic flux generator and cooperating with any one of the outlet body, the outlet cover and any combination thereof, the another magnetic flux generator acts, in use, to any one of magnetically attract, magnetically repulse and any combination thereof any one of the outlet body, the outlet cover and any combination thereof, to a position oppositely moved by the magnetic flux generator.

26. The molding machine mold assembly of claim 25, wherein:

the outlet cover is operatively movable relative to the outlet between a molten molding material flow disabled position in which the outlet is operatively covered by the outlet cover, and a molten molding material, flow enabled position in which the outlet is operatively uncovered.

27. The molding machine mold assembly of claim 25, wherein:

any one of the outlet body, the outlet cover and any combination thereof includes any one of a permanent magnet, a solenoid and any combination thereof.

28. The molding machine mold assembly of claim 26, wherein:

in the molten molding material flow disabled position, the outlet and the outlet cover remain substantially in contact with each other to substantially prevent, in use, any flow of molten molding material through the outlet; and in the molten molding material flow enabled position, the outlet and the outlet cover remain substantially spaced apart from one another to substantially permit, in use, a flow of molten molding material through the outlet.

29. The molding machine mold assembly of claim 25, wherein:

the magnetic flux generator cooperates with any one of the outlet body, the outlet cover and any combination thereof the magnetic flux generator acts, in use, to any one of magnetically attract, magnetically repulse and any combination thereof any one of the outlet body, the outlet cover and any combination thereof.

30. The molding machine mold assembly of claim 29, wherein:

the magnetic flux generator is any one of a permanent magnet, a solenoid and any combination thereof.

31. The molding machine mold assembly of claim 29, further comprising:

an energizing magnetic generator cooperating with the magnetic flux generator, and when energized the energizing magnetic generator magnetically couples magnetic force lines into the magnetic flux generator, the coupled magnetic force lines energizing the magnetic flux generator.

32. The molding machine mold assembly of claim 25, wherein:

the outlet body includes a housing having a molten molding material flow channel extending therethrough from an ingress end to an egress end;

the outlet cover includes a distal end of a stem movable relative to the egress end; and wherein the outlet is any one of the egress end and the ingress end.

33. The molding machine mold assembly of claim 32, further comprising:

a standoff attaching to the housing within the molten molding material flow channel;

wherein the stern is slidably cooperating with the standoff, and is movable towards and away from any one of the egress end, the ingress end and any combination thereof.

34. The molding machine mold assembly of claim 32, further comprising:

a barrel:

a base slidable within the barrel;

a stem member extending from the base, the outlet cover includes the distal end of the stem member; and a ring surrounding the stem member and being offset therefrom, and coaxially slidable along the stem;

wherein the ring is the outlet cover, wherein the combination of the barrel and the base is the outlet body, wherein a space between the base and the ring defines the outlet.

35. The molding machine mold assembly of claim 25, wherein:

the outlet cover includes a seat sealing member; and the outlet includes a seat surrounding the outlet, the seat being sealable by the seat sealing member.

36. The molding machine mold assembly of claim 25, wherein:

the magnetic flux is configured to any one of magnetically attractively move, magnetically repulsively move and any combination thereof the magnet and the outlet cover.

37. A molding machine, comprising:

a base; and any one of a mold assembly, a hot runner assembly and any combination thereof cooperating with the base, the mold assembly defining a mold assembly passageway therein, the hot runner assembly defining a hot runner assembly passageway therein;

a molten molding material dispenser cooperating with any one of the mold assembly passageway, the hot runner assembly passageway and any combination thereof, including:

an outlet body defining an outlet; and an outlet cover being mechanical-actuation disengaged, the outlet cover having a magnet being positionable proximate to:

a magnetic flux generator, the outlet being any one of coverable and uncoverable in response to the magnetic flux generator generating magnetic flux configured to magnetically move the magnet and the outlet cover relative to the outlet, and another magnetic flux generator being offset from the magnetic flux generator and cooperating with any one of the outlet body, the outlet cover and any combination thereof, the another magnetic flux generator acts, in use, to any one of magnetically attract, magnetically repulse and any combination thereof, any one of the outlet body, the outlet cover and any combination thereof, to a position oppositely moved by the magnetic flux generator.

38. The molding machine of claim 37, wherein:
the outlet cover is operatively movable relative to the outlet between a molten molding material flow disabled position in which the outlet is operatively covered by the outlet cover, and a molten molding material flow enabled position in which the outlet is operatively uncovered.

39. The molding machine of claim 37, wherein:
any one of the outlet body, the outlet cover and any combination thereof includes any one of a permanent magnet, a solenoid and any combination thereof.

40. The molding machine of claim 38, wherein:
in the molten molding material flow disabled position, the outlet and the outlet cover remain substantially in contact with each other to substantially prevent, in use, any flow of molten molding material through the outlet; and
in the molten molding material flow enabled position, the outlet and the outlet cover remain substantially spaced apart from one another to substantially permit, in use, a flow of molten molding material through the outlet.

41. The molding machine of claim 37, wherein:
the magnetic flux generator cooperates with any one of the outlet body, the outlet cover and any combination thereof the magnetic flux generator acts, in use, to any one of magnetically attract, magnetically repulse and any combination thereof any one of the outlet body, the outlet cover and any combination thereof.

42. The molding machine of claim 41, wherein:
the magnetic flux generator is any one of a permanent magnet, a solenoid and any combination thereof.

43. The molding machine of claim 41, further comprising:
an energizing magnetic generator cooperating with the magnetic flux generator, and when energized the energizing magnetic generator magnetically couples magnetic force lines into the magnetic flux generator, the coupled magnetic force lines energizing the magnetic flux generator.

44. The molding machine of claim 37, wherein:
the outlet body includes a housing having a molten molding material flow channel extending therethrough from an ingress end to an egress end; and
the outlet cover includes a distal end of a stem movable relative to the egress end;
wherein the outlet is any one of the egress end and the ingress end.

45. The molding machine of claim 44, further comprising:
a standoff attaching to the housing within the molten molding material flow channel;
wherein the stem is slidably cooperating with the standoff, and is movable towards and away from any one of the egress end, the ingress end and any combination thereof.

46. The molding machine of claim 44, further comprising:
a barrel;
wherein the base is slidable within the barrel;
a stem member extending from the base, the outlet cover includes the distal end of the stem member; and
a ring surrounding the stem member and being offset therefrom, and coaxially slidable along the stem;
wherein the ring is the outlet cover,
wherein the combination of the barrel and the base is the outlet body,
wherein a space between the base and the ring defines the outlet.

47. The molding machine of claim 37, wherein:
the outlet cover includes a seat sealing member; and
the outlet includes a seat surrounding the outlet, the seat being sealable by the seat sealing member.

48. The molding machine of claim 37, wherein:
the magnetic flux is configured to any one of magnetically attractively move, magnetically repulsively move and any combination thereof the magnet and the outlet cover.

49. A molding machine, comprising:
a base;
a barrel cooperating with the base, defining an internal chamber therethrough, and having a barrel distal end presenting a molten molding material exit therefrom;
a plasticizing screw cooperating with the barrel and having a plasticizing screw distal end;
a molten molding material dispenser cooperating with any one of the plasticizing screw distal end, the molten molding material exit and any combination thereof, including:
an outlet body defining an outlet; and
an outlet cover being mechanical-actuation disengaged, the outlet cover having a magnet being positionable proximate to:
a magnetic flux generator, the outlet being any one of coverable and uncoverable in response to the magnetic flux generator generating magnetic flux configured to magnetically move the magnet and the outlet cover relative to the outlet, and
another magnetic flux generator being offset from the magnetic flux generator and cooperating with any one of the outlet body, the outlet cover and any combination thereof, the another magnetic flux generator acts, in use, to any one of magnetically attract, magnetically repulse and any combination thereof, any one of the outlet body, the outlet cover and any combination thereof, to a position oppositely moved by the magnetic flux generator.

50. The molding machine of claim 49, wherein:
the outlet cover is operatively movable relative to the outlet between a molten molding material flow disabled position in which the outlet is operatively covered by the outlet cover, and a molten molding material flow enabled position in which the outlet is operatively uncovered.

51. The molding machine of claim 49, wherein:

any one of the outlet body, the outlet cover and any combination thereof includes any one of a permanent magnet, a solenoid and any combination thereof.

52. The molding machine of claim 50, wherein:

in the molten molding material flow disabled position, the outlet and the outlet cover remain substantially in contact with each other to substantially prevent, in use, any flow of molten molding material through the outlet; and in the molten molding material flow enabled position, the outlet and the outlet cover remain substantially spaced apart from one another to substantially permit, in use, a flow of molten molding material through the outlet.

53. The molding machine of claim 49, wherein:

the magnetic flux generator cooperates with any one of the outlet body, the outlet cover and any combination thereof, the magnetic flux generator acts, in use, to any one of magnetically attract, magnetically repulse and any combination thereof any one of the outlet body, the outlet cover and any combination thereof.

54. The molding machine of claim 53, wherein:

the magnetic flux generator is any one of a permanent magnet, a solenoid and any combination thereof.

55. The molding machine of claim 53, further comprising:

an energizing magnetic generator cooperating with the magnetic flux generator, and when energized the energizing magnetic generator magnetically couples magnetic force lines into the magnetic flux generator, the coupled magnetic force lines energizing the magnetic flux generator.

56. The molding machine of claim 49, wherein:

the outlet body includes a housing having a molten molding material flow channel extending therethrough from an ingress end to an egress end;

the outlet cover includes a distal end of a stem movable relative to the egress end; and wherein the outlet is any one of the egress end and the ingress end.

57. The molding machine of claim 56, further comprising:

a standoff attaching to the housing within the molten molding material flow channel;

wherein the stem is slidably cooperating with the standoff, and is movable towards and away from any one of the egress end, the ingress end and any combination thereof.

58. The molding machine of claim 56, further comprising:

a stem member extending from the base, the base slidable within the barrel, the outlet cover includes the distal end of the stem member; and a ring surrounding the stem member and being offset therefrom, and coaxially slidable along the stem;

wherein the ring is the outlet cover, wherein the combination of the barrel and the base is the outlet body, wherein a space between the base and the ring defines the outlet.

59. The molding machine of claim 49, wherein:

the outlet cover includes a seat sealing member; and the outlet includes a seat surrounding the outlet, the seat being sealable by the seat sealing member.

60. The molding machine of claim 49, wherein:

the magnetic flux is configured to any one of magnetically attractively move, magnetically repulsively move and any combination thereof the magnet and the outlet cover.

61. A molten molding material dispensing method, comprising:

mechanical-actuation disengaging an outlet cover, the outlet cover having a magnet being positionable proximate to:

a magnetic flux generator, and another magnetic flux generator being offset from the magnetic flux generator and cooperating with any one of an outlet body, the outlet cover and any combination thereof;

causing the magnetic flux generator to generate magnetic flux configured to magnetically move the magnet and the outlet cover relative to an outlet defined by the outlet body, thereby covering and uncovering the outlet; and causing the another magnetic flux generator to act, in use, to any one of magnetically attract, magnetically repulse and any combination thereof, any one of the outlet body, the outlet cover and any combination thereof, to a position oppositely moved by the magnetic flux generator.

62. The molten molding material dispensing method of claim 61, further comprising:

magnetically moving any one of the outlet body defining an outlet and the outlet cover relative to one another between a molten molding material flow disabled position, in which the outlet is operatively covered by the outlet cover, and a molten molding material flow enabled position, in which the outlet is operatively uncovered by the outlet cover.

63. The molten molding material dispensing method of claim 62, wherein:

in the molten molding material flow disabled position, the outlet and the outlet cover remain substantially in contact with each other to substantially prevent, in use, any flow of molten molding material through the outlet; and in the molten molding material flow enabled position, the outlet and the outlet cover remain substantially spaced apart from one another to substantially permit, in use, a flow of molten molding material through the outlet.

* * * * *